US005885085A

United States Patent [19]

Fujita

[11] Patent Number: 5,885,085

[45] Date of Patent: Mar. 23, 1999

[54] DRIVE-IN INTERACTIVE SYSTEM

[75] Inventor: Hiroyuki Fujita, Hamamatsu, Japan

[73] Assignee: Yamaha Corporation, Hamamatsu, Japan

[21] Appl. No.: 753,150

[22] Filed: Nov. 20, 1996

[30] Foreign Application Priority Data

Nov. 24, 1995 [JP] Japan .................................... 7-305598

[51] Int. Cl.[6] ............................... A63H 1/28; G09B 5/08; G10H 1/26

[52] U.S. Cl. ................................. 434/307 A; 434/307 R; 434/365; 381/78; 348/13; 340/901; 84/609; 84/610; 463/40

[58] Field of Search ................................ 434/307 R–309, 434/318, 365; 84/477 R, 609–613, 634–673, 644, 650–652, 662; 381/78, 86; 463/40; 359/159, 172, 180; 340/825.08, 901; 370/449; 455/4.2, 5.1, 6.1, 6.3, 526; 348/8, 12–14, 102, 564, 739; 386/96, 102; 369/47; 345/1, 327; 344/734; 353/837

[56] References Cited

U.S. PATENT DOCUMENTS

| | | | |
|---|---|---|---|
| 3,996,518 | 12/1976 | Halstead et al. | 455/6.3 X |
| 4,047,109 | 9/1977 | Sekiguchi | 381/78 X |
| 4,209,663 | 6/1980 | Sekiguchi | 455/6.3 |
| 5,281,985 | 1/1994 | Chan | 348/837 X |
| 5,323,257 | 6/1994 | Abe et al. | 359/159 |
| 5,325,423 | 6/1994 | Lewis | 379/93.08 |
| 5,485,442 | 1/1996 | Furukawa et al. | 369/47 |
| 5,486,645 | 1/1996 | Suh et al. | 84/610 |
| 5,510,573 | 4/1996 | Cho et al. | 84/610 |
| 5,510,828 | 4/1996 | Lutterbach et al. | 348/13 |
| 5,588,842 | 12/1996 | Nishimura et al. | 434/307 A |
| 5,589,947 | 12/1996 | Sato et al. | 386/102 X |
| 5,613,192 | 3/1997 | Ikami et al. | 434/307 A X |
| 5,675,390 | 10/1997 | Schindler et al. | 345/327 |
| 5,675,509 | 10/1997 | Ikami et al. | 348/7 X |
| 5,684,843 | 11/1997 | Furukawa et al. | 340/825.08 X |
| 5,735,744 | 4/1998 | Okamoto | 463/40 |
| 5,808,224 | 9/1998 | Kato | 84/609 |
| 5,810,603 | 9/1998 | Kato et al. | 434/307 A |

*Primary Examiner*—Joe H. Cheng
*Attorney, Agent, or Firm*—Loeb & Loeb LLP

[57] ABSTRACT

A drive-in interactive performance system including a parking space in which at least a car can be parked and an interactive performance apparatus associated with the parking space and operable from within the car. The drive-in interactive performance system allows a user in the car to enjoy a variety of interactive performances, such as, for example, a karaoke performance, an interactive game and the like. For example, in a karaoke interactive system, the user operates a command device in the car to select a karaoke song and send a karaoke request signal for the karaoke song to the karaoke apparatus. A wireless microphone picks up the voice of the user who is sitting and singing in the car and sends a voice signal of the user's voice to the karaoke apparatus. The karaoke apparatus generates a karaoke performance signal based on the karaoke request signal and the voice signal and also generates an image signal for an image associated with the selected song. A projector device is installed adjacent the parking space for projecting the image onto a projector screen installed in front of the car. The karaoke performance signal is transmitted to a car radio system of the car so that karaoke performance is performed in the car.

18 Claims, 6 Drawing Sheets

DRIVE-IN INTERACTIVE SYSTEM

BACKGROUND OF THE INVENTION

1. Field of the Invention

The present invention relates to an interactive system in which passengers in a car operate an interactive apparatus located outside the car and enjoy karaoke songs, games and the like while the passengers remain inside the car. More particularly, the present invention relates to a drive-in interactive system that includes a parking space for parking at least one car and at least one interactive system. The at least one interactive system is located outside the car and is associated with the parking space in which users in the car operate the interactive system from within the car and enjoy a karaoke performance, a game and the like inside the car.

2. Description of Related Art

Typically, customers may drive to a karaoke house that has individual karaoke performance rooms. Each karaoke performance room is acoustically insulated and equipped with a karaoke apparatus so that the customers may privately enjoy karaoke performance in an individual, acoustically insulated karaoke performance room. When customers drive to a karaoke house, they park their car somewhere near and outside the karaoke house, walk to the karaoke house, check in at the counter of the karaoke house for a karaoke performance room, walk to the karaoke performance room and finally enjoy a karaoke performance in the karaoke performance room. Therefore, when a business establishment, such as, for example, a karaoke house, is built for customers including passengers who arrive in cars, a parking lot for parking cars must be provided in addition to the karaoke house building that contains the relatively expensive, acoustically insulated karaoke performance rooms, each containing a karaoke apparatus. Therefore a large lot is required for the business establishment and the construction cost is increased.

Furthermore, since customers arriving in cars have to park their cars and walk all the way to the karaoke house building and to karaoke performance rooms, the customers arriving in cars cannot readily and quickly start a karaoke performance. When customers drive to a game center, the customers may have the same inconveniences.

SUMMARY OF THE INVENTION

It is an object of the present invention to provide a karaoke system or other interactive entertainment systems that allow passengers in a car to operate a karaoke apparatus or other interactive apparatus located outside of the car and to enjoy karaoke or interactive performance while the passengers remain in the car.

In accordance with an embodiment of the present invention, a karaoke system includes a parking space in which at least a passenger car can be parked and a main karaoke apparatus that is associated with the parking space and located outside the passenger car. In one embodiment, the karaoke system uses a car radio of the passenger car for reproducing a karaoke performance. The karaoke system also includes a command device and a wireless microphone that are used by passengers in the car. The command device is operated by a passenger in the car for controlling the main karaoke apparatus and the wireless microphone picks up the voice of the passenger singing a karaoke song and transmits a voice signal of the passenger's voice. A projector device is disposed in the parking space for projecting song lyrics of the karaoke song and a background image associated with the karaoke song onto a projector screen in response to requests made by the command device. The karaoke system includes a receiver device for receiving the song signal transmitted from the wireless microphone and a transmitter device for transmitting a karaoke performance signal for the karaoke song and the song signal received by the receiver device to the car radio.

When a user parks her or his car, that is generally equipped with a car radio system or a car stereo system, in the parking space, the user uses the command device to make a request for a karaoke song. The main karaoke apparatus generates a karaoke accompaniment music signal in response to the request. The karaoke accompaniment music signal is transmitted by radio waves to the car radio system. Synchronized with the karaoke accompaniment music signal, the main karaoke apparatus generates characters for the lyrics of the karaoke song and a background image associated with the karaoke song. The characters and the background image are then projected by the projector device onto the projector screen. While listening to the car radio playing the karaoke accompaniment music and viewing the image projected on the projector screen, the user or passenger sings the karaoke song with the karaoke accompaniment music. A song signal of the user's or passenger's singing voice is transmitted to the main karaoke apparatus via the wireless microphone and mixed with the karaoke accompaniment music signal to form a karaoke performance signal. The karaoke performance signal is transmitted from the main karaoke apparatus to the car radio system for reproducing the user's or passenger's singing voice and the karaoke accompaniment music.

In accordance with another embodiment of the present invention, an interactive system includes a parking space in which at least a passenger car can be parked and an interactive apparatus that is associated with the parking space and located outside the passenger car. In one embodiment, the interactive system provides an interactive performance, such as an interactive game and the like, and uses a car radio of the passenger car for reproducing sounds, such as, for example, a background music, sound effects, and the like, associated with the interactive performance. The interactive system also includes a controller/command device that is used by passengers in the car. The controller/command device is operated by a passenger in the car for controlling the interactive apparatus and also the interactive performance. A projector device is disposed in the parking space for projecting images associated with the interactive performance onto a projector screen in response to requests and commands made by the controller/command device.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings.

DETAILED DESCRIPTION OF EMBODIMENTS

Figure 1:
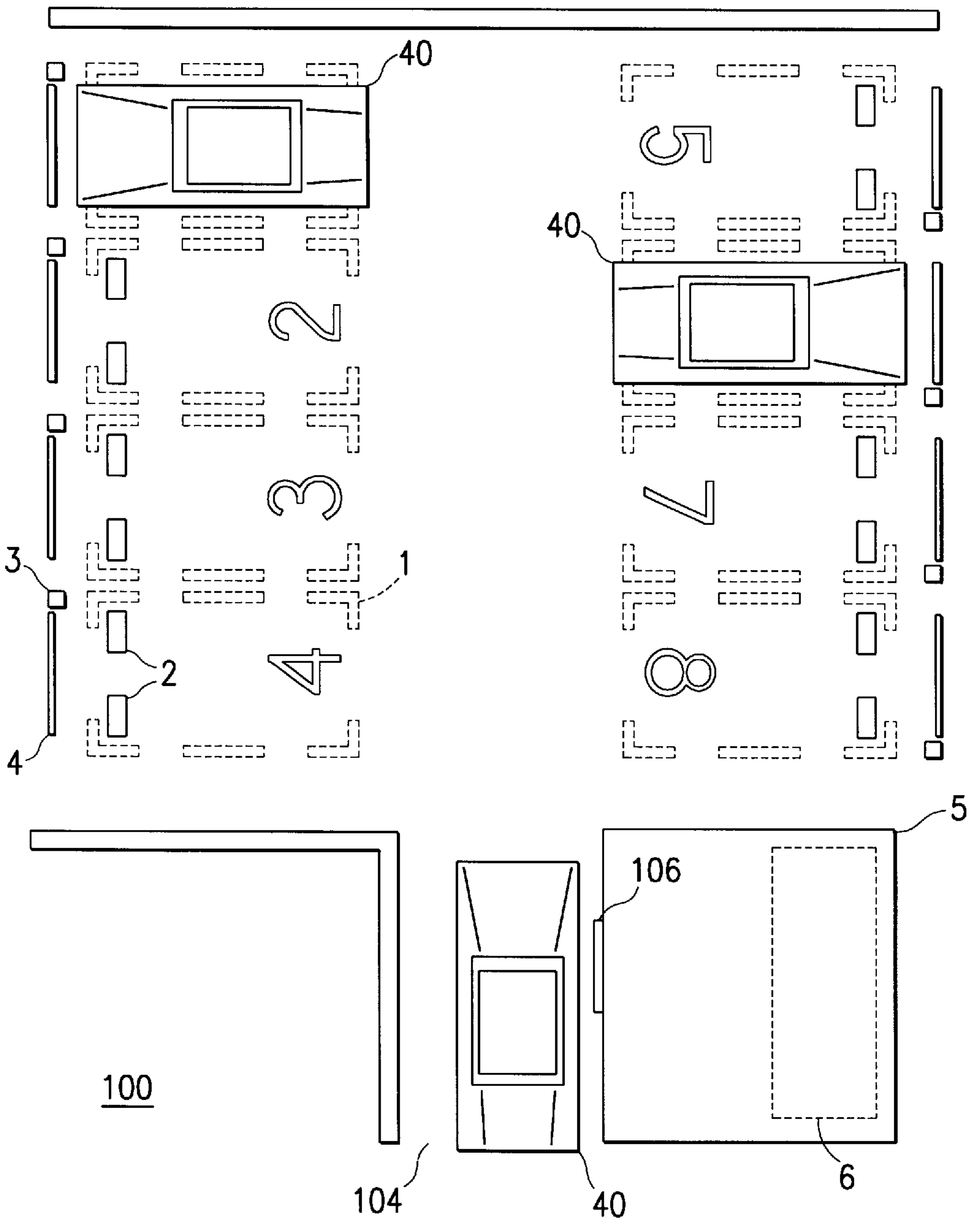
FIG. 1 shows an overhead view of a drive-in karaoke system in accordance with an embodiment of the present invention.
Figure 2:
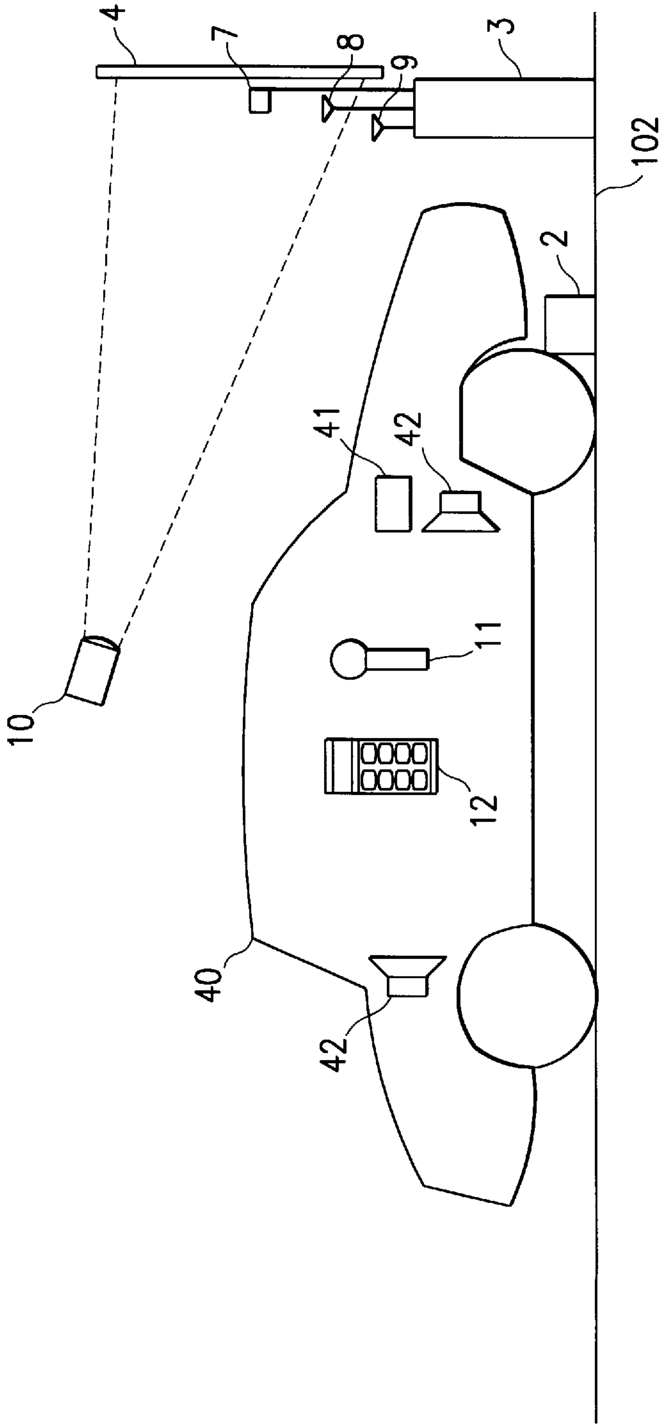
FIG. 2 shows a side view of a parking space structure in a drive-in karaoke system in accordance with an embodiment of the present invention.

FIGS. 1 and 2 show, in accordance with a first embodiment of the present invention, a parking lot style karaoke facility (hereinafter referred to as a drive-in karaoke facility) 100. The drive-in karaoke facility 100 includes a plurality of parking spaces 1. Each of the parking spaces 1 includes a variety of equipment (that is described later in detail) that allows customers in a passenger car 40 parked in the parking space 1 to enjoy a karaoke performance inside the passenger car 40.

A transmitter/receiver tower or wall 3 is installed at a front end section 102 of the respective parking space 1 so that the front end of the passenger car 40 faces the transmitter/receiver tower 3 when parked in the parking space 1. A projection screen 4 is installed on or over the transmitter/receiver tower 3 in the front end section 102 of the respective parking space 1. A projector 10 is installed at a location appropriate for projecting background images and song lyrics of karaoke songs on the projection screen 4. In accordance with embodiments of the present invention, the passenger car 40 is equipped with a car radio/audio apparatus 41, such as, for example, an audio apparatus with an AM/FM radio tuner, a car stereo apparatus with an AM/FM radio tuner and the like. The car radio/audio apparatus 41 is connected to a plurality of loudspeakers 42 which are installed within the passenger car 40. In an alternative embodiment, an independent audio system with an AM/FM radio tuner or with a radio wave signal receiver may be used or a system may be supplied by the karaoke establishment.

In accordance with an embodiment of the present invention, a management office 5 is built at an entrance 104 of the drive-in karaoke facility 100. At a window 106 of the management office 5, users (customers) in a car receive a wireless microphone 11 and a command device 12 to be used in the car for controlling a main karaoke apparatus 6. In this particular embodiment, the main karaoke apparatus 6 is installed in the management office 5 in this particular embodiment. Alternatively, the main karaoke apparatus 6 may be installed at any appropriate location other than the management office 5.

The transmitter/receiver tower 3 has a transmitter antenna 8 and a receiver antenna 9 mounted at the top of the tower 3, which are connected to the main karaoke apparatus 6. A signal receiving section 7 is provided above the transmitter/receiver tower 3 for receiving a signal emitted from the command device 12 that is operated by the user in the passenger car 40.

The command device 12 has a plurality of key switches. The user in the passenger car 40 inputs a song code for selecting a karaoke song associated with the inputted song code by depressing the key switches. Song codes may be listed in a song book that contains a list of titles of karaoke songs and corresponding song codes, and the song book may be handed out by a staff member at the management office together with the command device 12 and the microphone 11. Alternatively, titles of the songs and the corresponding codes may be displayed on the projection screen 4, for example, by the operation of the command device 12. In a preferred embodiment, the command device 12 is an infrared remote controller and the signal receiving section 7 is an infrared receiving unit. The user in the passenger car 40 selects a karaoke song by the command device 12 that in turn generates an infrared signal representative of the selected karaoke song. The signal receiving section 7 then receives the infrared signal emitted from the command device 12.

As described later in detail, the signal received by the signal receiving section 7 is sent to the main karaoke apparatus 6. The main karaoke apparatus 6 generates a karaoke accompaniment signal for the selected karaoke song in response to the signal sent from the signal receiving section 7. The karaoke accompaniment signal is converted to an appropriate radio wave signal representative of the karaoke accompaniment music. In a preferred embodiment, the signal generated by the main karaoke apparatus is a high frequency FM radio signal. The karaoke accompaniment signal is sent to the transmitter antenna 8 and is then transmitted from the transmitter antenna 8 to the car radio/audio apparatus 41 in the passenger car 40.

In a preferred embodiment, the main karaoke apparatus 6 also reproduces a background image and a character image of song lyrics for the selected karaoke song, as described below in more detail. An image signal representative of the background image and the character images is sent to the projector 10 for projecting the background image and the song lyrics onto the projection screen 4.

While viewing the background image and the song lyrics displayed on the projection screen 4 and listening to the karaoke accompaniment music, the user sings the karaoke song, with the karaoke accompaniment music, into the wireless microphone 11. The wireless microphone 11 generates a voice signal representative of the singing voice of the user and transmits the voice signal to the receiver antenna 9. In a preferred embodiment, the wireless microphone 11 uses a VHF band frequency to frequency-modulate the voice signal of the user's singing voice for transmission to the receiver antenna 9. The voice signal is sent to the main karaoke apparatus 6 and mixed with the karaoke accompaniment signal to form a karaoke performance signal. The karaoke performance signal is sent to the transmitter antenna 8 for transmitting the karaoke performance signal to the car radio/audio apparatus 41 of the passenger car 40. In the passenger car 40, the karaoke performance, that includes the singing voice of the user accompanied by the karaoke accompaniment music, is reproduced by the car radio/audio apparatus 41.

When the customers leave the drive-in karaoke facility 100, the customers pay the charge at the window 106 of the management office 5 and return the wireless microphone 11 and the command device 12.

Figure 3:
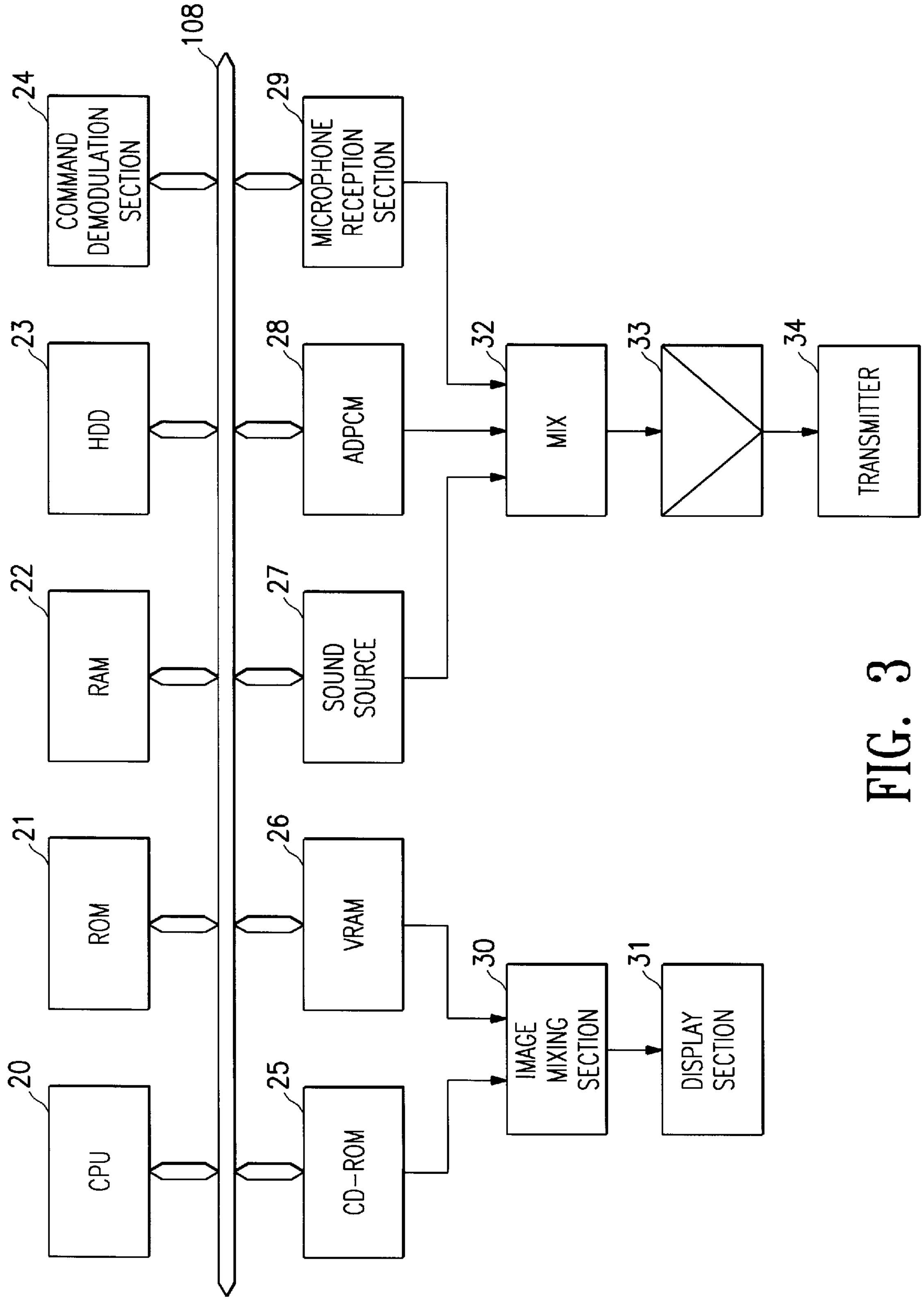
FIG. 3 shows a block diagram of a main karaoke performance apparatus of a drive-in karaoke system in accordance with an embodiment of the present invention.

FIG. 3 shows a block diagram of the main karaoke apparatus 6. A CPU 20 controls the operation of the entire drive-in karaoke facility 100. The CPU 20 is connected, via a bus 108, to a ROM 21, a RAM 22, a hard disk drive (HDD) 23, a command demodulation section 24, a CD-ROM reproducing apparatus 25, a VRAM 26, a sound source apparatus 27, an adaptive differential pulse code modulation (ADPCM) decoder 28 and a microphone receiver device 29.

The ROM 21 stores system programs for controlling the operation of the drive-in karaoke facility 100 and application programs for performing karaoke performances. The HDD 23 stores song data for several hundred to several thousand karaoke songs. Each portion of song data is representative of an individual karaoke song and is formed from data in an accompaniment musical sound track, a voice track and a song lyric display track. Each portion of song data has an associated song code that is used to select a karaoke song associated with the song code. Song data for a karaoke song, that is selected by the command device 12, is written in the RAM 22. The CPU 20 successively reads out the song data from the RAM 22 for performing the karaoke song.

The sound source apparatus 27 generates a karaoke accompaniment signal based on data read from the accompaniment musical sound track of the song data. The ADPCM decoder 28 generates a chorus signal representative of a background chorus and the like based on data of the voice track of the song data. The microphone reception device 29 receives a signal representative of the singing voice of the karaoke user in the form of a modulated radio wave at a VHF frequency that is transmitted from the wireless microphone 11 and demodulates the received signal into a voice signal. The microphone reception section 29 also adds sound effects, such as, for example, echo, vibrato and the like to the voice signal. The karaoke accompaniment signal, the chorus signal and the voice signal, that are outputted from the sound source device 27, the ADPCM decoder 28 and the microphone reception device 29, respectively, are inputted to a mixer 32. The mixer 32 mixes the karaoke accompaniment signal, the chorus signal and the voice signal at an appropriate balance to generate a mixed karaoke performance signal. The mixed karaoke performance signal is amplified by an amplifier 33 and transmitted by a transmitter 34 on an FM radio wave through the transmitter antenna 8.

The CD-ROM reproducing apparatus 26 reproduces background images for associated karaoke songs. When a karaoke song is selected by the command device 12, a background image is selected based on, for example, the genre of the karaoke song. The selected background image is read out from the CD-ROM reproducing apparatus 25, and outputted to an image mixing section 30. Also, character patterns for lyrics of the karaoke song are generated based on song lyric code data that is read out from the song lyric display track of the song data and written in the VRAM 26. The character patterns are then inputted in the image mixing section 30. The image mixing section 30 superimposes the song lyrics over the background image to form a display image signal. The display image signal is inputted to a projection section 31. A display image representative of the display image signal is then projected by the projector 10 onto the projection screen 4. In alternative embodiments, any one of other display apparatuses, such as, for example, a CRT display apparatus, a liquid crystal display apparatus, or a plasma display apparatus may be disposed over the tower 3 such that the display apparatus faces the passenger car 40 parked in the parking space 1. In this instance, the display image signal is inputted in the display apparatus to display the display image.

In accordance with a preferred embodiment of the present invention, when a karaoke user inputs a song code by the command device 12 to select a karaoke song, the command device 12 transmits the code as an infrared signal. The signal receiving section 7 receives the infrared signal, converts the infrared signal into an electrical signal and transmits the electrical signal to the command demodulation section 24. The command demodulation section 24 demodulates the electrical signal into a command (such as, for example, the song code). The CPU 20 reads the command and performs a process associated with the command. If the command is representative of a request for a karaoke song and the request includes a song code, the CPU 20 reads song data for the karaoke song associated with the song code from the HDD 23 and writes the song data in the RAM 22. Based on the genre of the song data, a background image is selected from the CD-ROM reproducing apparatus 25. Thereafter, data on the accompaniment musical sound track and data on the voice track of the song data of the song data are read from the HDD 23 and inputted to the sound source apparatus 27 and the ADPCM decoder 28, respectively. Also, character patterns are generated based on character data on the song lyric display track and written in the VRAM 26.

The sound source apparatus 27 generates a musical signal based on the inputted data of the musical sound track and inputs the musical signal to the mixer 31. The ADPCM decoder 29 reproduces a voice signal, for example, for a background chorus based on the inputted data of the voice track. The ADPCM decoder 29 inputs the voice signal of the background chorus (chorus signal) to the mixer 31. The mixer 31 mixes the musical signal and the chorus signal at an appropriate balance to generate a mixed signal and inputs the mixed signal to the amplifier 32. The amplifier 32 amplifies the mixed signal to an appropriate loudness and inputs the mixed signal in the transmitter 33. The transmitter 33 frequency-modulates the mixed signal with a high frequency radio wave at an FM radio frequency and sends the frequency-modulated (FM) signal to the transmitter antenna 8 from which the FM signal is transmitted. The FM signal is received by the car radio/audio apparatus 41, and the loudspeakers 42 within the car 40 create sounds of the karaoke accompaniment for the selected karaoke song.

The background image reproduced by the CD-ROM reproducing apparatus 25 and the character patterns of the song lyrics written in the VRAM 26 are mixed by the image mixing section 27, and projected by the projector 10 onto the projection screen 4. The karaoke user sings the karaoke song into the wireless microphone 11 while listening to the sound of the karaoke accompaniment and viewing the song lyrics displayed on the projection screen 4. The wireless microphone 11 transmits a voice signal of the user's singing voice on an FM radio wave. The FM radio wave of the voice signal is received by the receiver antenna 9, and decoded by the microphone receiver section 29 into a voice signal of the user. The decoded voice signal is inputted in the mixer 32. The karaoke accompaniment signal, the chorus signal and the voice signal are mixed by the mixer at an appropriate balance to generate a mixed karaoke performance signal. The mixed karaoke performance signal is amplified by an amplifier 33 and transmitted by a transmitter 34 on an FM radio wave through the transmitter antenna 8. As a result, the audio/radio apparatus 41 in the car 40 reproduces the karaoke song of the karaoke user accompanied by the karaoke accompaniment music including the background chorus.

In a preferred embodiment, the microphone receiver section 29 includes a low pass filter at its input section to prevent howling of the karaoke performance sound and the voice sound between the loudspeakers 42 and the microphone 11.

It is noted that a start-up operation may be performed to tune the FM receiver frequency of the audio/radio apparatus 41 of the car 40 to the transmission frequency.

The above embodiment is described with reference to a karaoke performance performed by one user or one of several users in a single-passenger car 40. However, the drive-in karaoke facility 100 may be arranged so that the same karaoke performance can be shared simultaneously by users in different cars parked in corresponding different parking spaces. In this instance, the singing voice of one of the users picked up by the wireless microphone 11 is arranged so that the singing voice can be commonly heard by the other users in each of the cars. Also, the drive-in karaoke system may be arranged so that the parking spaces are grouped into any desired areas so that users in a plurality of cars in each of the areas can enjoy karaoke performance independently of users in the other areas.

The main karaoke apparatus shown in FIG. 3 is provided for each parking space in accordance with an embodiment of the present invention. However, a plurality of voice and image reproducing apparatuses may be connected in parallel with one another so that one main apparatus is used for a plurality of parking spaces.

In the embodiment described above, each parking space is marked on the floor or the slab of the drive-in karaoke facility 100 for each car 40 and no partitions are provided between two adjacent parking spaces. However, partitions or walls may be provided between two adjacent parking spaces. Also, a ceiling may be provided over the parking space. Even in this case, a high level sound insulation structure is not required because passenger cars have substantially high screening and sound insulation capabilities.

In accordance with embodiments of the present invention, a parking space and a space for karaoke performance are integrated. As a result, the overall space required for a karaoke facility and a parking space for karaoke customers who arrive in cars is substantially reduced. Moreover, car radio/audio equipment and facilities of a passenger car are substituted for audio equipment and interior facilities of a karaoke business establishment, such as, a karaoke house and the like. Accordingly, a karaoke facility and a karaoke business establishment can be constructed at a lower cost, and the maintenance of the karaoke house interior and facility is substantially facilitated.

Furthermore, customers in cars can enjoy karaoke performance without stepping out of the cars, and karaoke charges can be low because of the lowered construction and maintenance cost described above. As a consequence, the present invention provides a karaoke system that is readily enjoyed by customers who arrive in cars.

Figure 4:
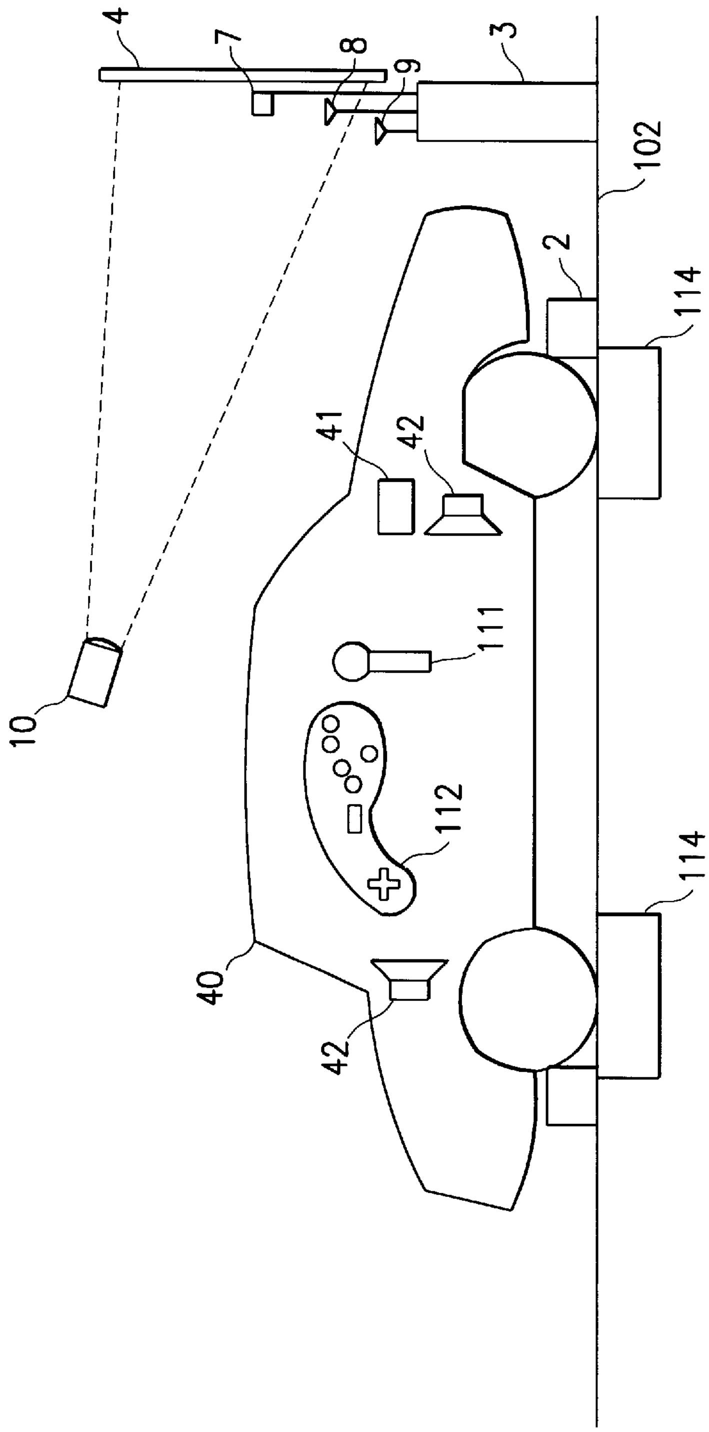
FIG. 4 shows a side view of a parking space structure in a drive-in interactive system in accordance with an embodiment of the present invention.
Figure 5:
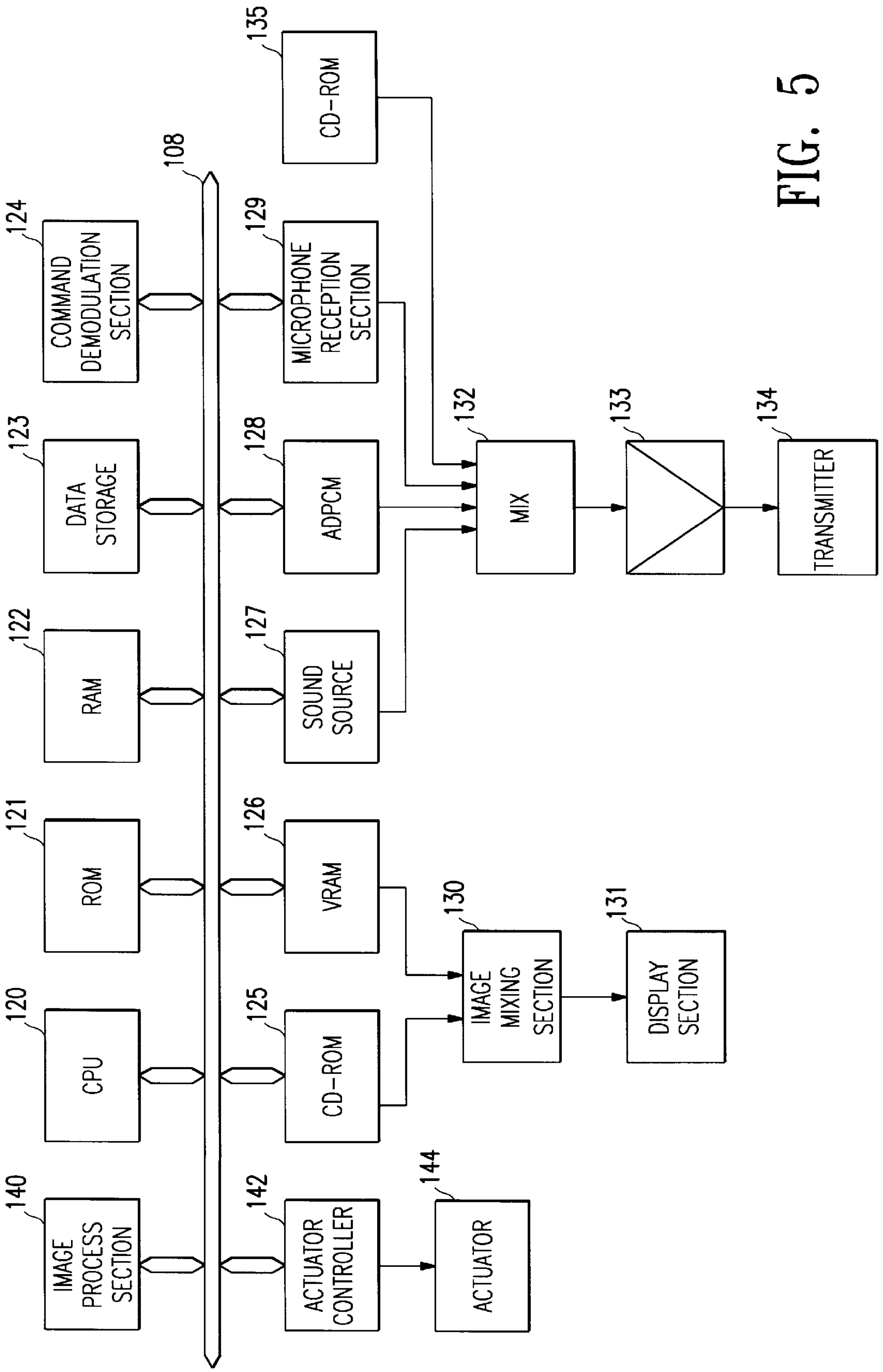
FIG. 5 shows a block diagram of a main interactive performance apparatus of a drive-in interactive system in accordance with an embodiment of the present invention.

FIGS. 4 and 5 show a parking lot style media playing facility (hereinafter referred to as a drive-in media playing facility) in accordance with a second embodiment of the present invention. The drive-in media playing facility includes at least one drive-in media playing system that is associated with each one of the parking spaces 1. The drive-in media playing system provides various interactive media that can be selected by users (customers). The interactive media includes, for example, an interactive game, an interactive presentation or a game on the Internet, a karaoke performance and the like. Users (customers) in a car operate a wireless controller/command device 112 to control various interactive media provided by the drive-in media playing system. A wireless microphone 111 may be used for performing a karaoke performance. In an alternative embodiment, the wireless microphone 111 is used for transmitting a voice command signal that may be required for controlling the interactive game or the like.

In accordance with an embodiment of the present invention, the drive-in media playing system includes an actuator apparatus 144 that is installed in the floor of the parking space 1. The actuator apparatus 144 may be formed by a single actuator unit or a plurality of actuator units so that the car 40 is parked on the actuator apparatus 114 as shown in FIG. 4. The actuator apparatus 144 is connected to the main interactive apparatus 6 and preferably actuated in synchronization with the interactive media such as an interactive game to provide various movements for the parked car 40, such as, tilt movements, rolling movements, vibrational movements and the like. As a result, the actuator apparatus 144 adds an enhanced feeling of reality to the interactive game. The drive-in interactive facility is arranged in a similar manner as the drive-in karaoke facility 100 shown in FIG. 1. Therefore, similar elements, devices and apparatuses in the second embodiment are designated by the same reference numerals used in the first embodiment.

FIG. 5 shows a block diagram of the main interactive apparatus 6. In the illustrated embodiment, a ROM 121 stores a system program that operates the drive-in interactive facility 100. A RAM 122 stores programs that are frequently changed, for example, a menu program or the like. The RAM 122 may store data that is read out from a data storage 123. In an embodiment, the data storage 123 is composed of disc type storage media, such as CD-ROMs, laser discs, DVD discs or the like. The data storage 123 stores data for karaoke performances, game programs, data for the Internet and the like. A command demodulation section 124 demodulates data transmitted from the wireless controller/command device 112. A VRAM 126 stores data sent from other data sources, such as, for example, the ROM 121 and the RAM 122. Data stored in the VRAM 126 is used for displaying images representative of the stored data on the display screen 4. A CD-ROM 125 is exclusively used for storing data for a karaoke performance. When a game or a media on the Internet is selected, the CD-ROM 125 is not used. An image mixing section 130 mixes data transmitted from the CD-ROM 125 and the VRAM 126 to form image data that is sent to the display section 131. When the CD-ROM 125 is not used, data from the VRAM 126 passes through the image mixing section 130 without being processed and is transmitted to the display section 131. A CD-ROM 135 stores data similar to data stored in the data storage 123. For example, the CD-ROM 135 may be used to store program data. Alternatively, the CD-ROM 135 is used to store data for PCM voice signals as background music for games. The PCM voice signals are directly read out from the CD-ROM 135 and reproduced when the background music is needed for a selected game. An image process section 140 processes polygons and a variety of image effects. An actuator controller 142 drives the actuator apparatus 144 in response to instructions from the CPU 120.

Figure 6:
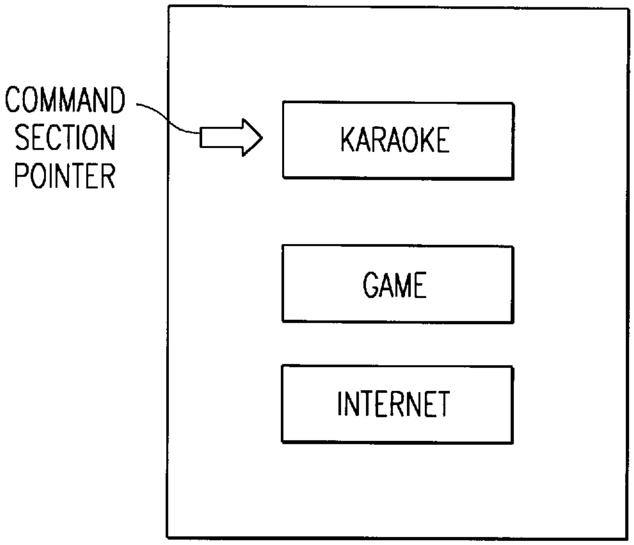
FIG. 6 shows a front view of a menu selection screen in accordance with an embodiment of the present invention.

At the window 106 of the management office 5, or after the car 40 is parked in one of the parking spaces 1, users (customers) in the car 40 receive the wireless microphone 111 and the wireless controller/command device 112. When the power is turned on for a drive-in media playing system that is associated with the parking space 1 in which the car 40 is parked, the system program stored in the ROM 121 is read out, and executed by the CPU 120. The RAM 122 may store a menu program for displaying a menu or the like on the display screen 4. When the system program is executed by the CPU 120, the menu program is also read out by the CPU 120 and executed so that the menu is displayed when the drive-in media play system is activated. FIG. 6 shows an example of the displayed menu that lists three different items, KARAOKE, GAME and INTERNET. In the illustrated embodiment, a command selection pointer is also displayed on the display screen 4 to facilitate selection of the items.

The menu program may be stored in the ROM 121 instead of the RAM 122. However, in this case, contents of the menu program and thus interactive media such as games and karaoke performances related to the menu program are fixed and cannot be changed unless the ROM 121 is changed. Therefore, when the contents of the menu program are changed, the ROM 121 is changed.

The users use the wireless controller/command device 112 to select one of the listed items from the menu shown in FIG. 6. When "KARAOKE" is selected, the drive-in media playing system performs the same operations as performed in the drive-in karaoke facility described above. However, it is noted that the wireless controller/command device 112 is used to select a karaoke song and song data is stored in the data storage 123.

When "GAME" or "INTERNET" is selected, a required program is transferred from the data storage 123 or the CD-ROM 135 to the RAM 122 and written in a specified area within the RAM 122. The program stored in the RAM 122 is read out and executed under the control of the CPU 120. Accordingly, a game or a grogram on the Internet is started.

When "GAME" is selected, a further selection menu containing various games is displayed (not shown). Users select one of the listed games to play the game. When the game is played, required data, including program data, is read out from the data storage 123 or the CD-ROM 135 and temporarily stored in the RAM 122 for execution. In response to operation of the wireless controller/command device 112, required image data is read out from the data storage 123 or the CD-ROM 135 to the VRAM 126. The image data is then displayed on the display screen 4. When image data contains data for polygons representative of three-dimensional images, the image data is first processed by the image process section 140 and sent to the VRAM 126. When compressed moving picture data such as MPEG data is stored in the data storage 123 or the CD-ROM 135, the data is first decoded by the image process section 140 and sent to the VRAM 126.

Sound data for pieces of music, human voice and sound effects stored in the data storage 123 is read in the RAM 122. The sound data stored in the RAM 122 is read out at the appropriate time and reproduced by the sound source apparatus 127. When the sound data contains voice data, the ADPCM 128 is used to reproduce voice sound representative of the voice data. Background music data for back ground music may be stored in the CD-ROM 135 in an audio CD format (at PCM 16 bits and at fs=44.1 kHz). In this case, the background music data the CD-ROM 135 is directly sent to the transmitter 134 through the mixer 132 and the amplifier 133.

When "INTERNET" is selected from the menu, an Internet browser is activated and displayed on the display screen 4 so that the users in the car 40 can use the Internet from within the car 40. The Internet browser displayed on the display screen 4 is controlled by the wireless controller/command device 112.

While the description above refers to particular embodiments of the present invention, it will be understood that many modifications may be made without departing from the spirit thereof. For example, only one display screen is used for the interactive performance facility in the above-described second embodiment of the present invention. However, in alternative embodiments, a curved circular display screen, a multiple-panel display screen (e.g., four display screens), or a 360° circular display screen may be installed so that a car parked in the parking area 1 is substantially surrounded by images displayed on the display screen. Accordingly, the accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A karaoke system for a car having a radio, the system comprising:

a karaoke apparatus;

a space for parking the car, the space being associated with the karaoke apparatus;

a command device that selects a karaoke song and sends a song request signal associated with the karaoke song to the karaoke apparatus;

a microphone device that sends a voice signal to the karaoke apparatus;

an operation signal generating device in the karaoke apparatus that generates a karaoke performance signal based on the song request signal and the voice signal and an image signal for an image associated with the karaoke song selected by the command device;

an image forming device disposed adjacent the parking space for forming the image generated by the karaoke apparatus; and a transmitter device coupled to the karaoke apparatus for transmitting the karaoke performance signal to the car radio.

2. A karaoke system as set forth in claim 1, further comprising a first receiver device coupled to the karaoke apparatus and a second receiver device coupled to karaoke apparatus, wherein the microphone device is a wireless microphone for transmitting the voice signal to the first receiver device, and the command device is a wireless command device for transmitting the song request signal to the second receiver device.

3. A karaoke system as set forth in claim 2, wherein the wireless command device is an infrared command device for transmitting an infrared light signal representative of the song request signal, and the second receiver device is an infrared light receiver for receiving the infrared light signal sent from the infrared command device.

4. A karaoke system as set forth in claim 1, wherein the operation signal generating device comprises a mixer device that mixes the karaoke performance signal and the voice signal to form the karaoke performance signal and a radio transmitter, coupled to the transmitter device, that generates a radio signal representative of the karaoke performance signal and receivable by the car radio of the car.

5. A karaoke system as set forth in claim 1, wherein the image forming device comprises an image projector and a projector screen disposed adjacent the parking area and wherein the image projector projects the image onto the projector screen.

6. A karaoke system for a car having a radio, the system comprising:

a karaoke apparatus;

a space for parking the car, the space being associated with the karaoke apparatus;

a wireless command device that selects a karaoke song and sends a song request signal associated with the karaoke song;

a command signal receiver device connected to the karaoke apparatus that receives the song request signal and sends the song request signal to the karaoke apparatus;

a wireless microphone that transmits a voice signal representative of voice of a user;

a receiver antenna connected to the karaoke apparatus that receives the voice signal and sends the voice signal to the karaoke apparatus;

a karaoke performance signal generating device in the karaoke apparatus that generates a karaoke performance signal based on the song request signal and the voice signal;

an image signal forming device in the karaoke apparatus that generates an image signal for an image associated with the karaoke song selected by the wireless command device;

an image forming device disposed adjacent the parking space for forming the image; and a transmitter antenna coupled to the karaoke performance signal generating device for transmitting the karaoke performance signal to the car radio.

7. A karaoke system as set forth in claim 6, wherein the wireless command device is an infrared command device for transmitting an infrared light signal representative of the song request signal, and the command signal receiver device is an infrared light receiver for receiving the infrared light signal sent from the infrared command device.

8. A karaoke system as set forth in claim 6, wherein the image forming device comprises an image projector and a projector screen disposed adjacent the parking area wherein the image projector projects the image onto the projector screen.

9. A method of operating a karaoke system comprising the steps of:

parking a car having a car radio in a parking space;

associating the parking space with a karaoke apparatus;

sending a song request signal for a karaoke song from inside the car to the karaoke apparatus;

sending a voice signal representative of voice of a user from inside the car to the karaoke apparatus;

generating a karaoke performance signal based on the song request signal and the voice signal and an image signal for an image associated with the karaoke song;

forming the image on an image forming screen provided adjacent the parking space; and sending the karaoke performance signal to the car radio.

10. A method of operating a karaoke system as set forth in claim 9, further comprising the steps of sending the song request signal from a wireless command device to a first receiver device coupled to the karaoke apparatus and sending the voice signal from a wireless microphone to a second receiver device coupled to the karaoke apparatus.

11. A method of operating a karaoke system as set forth in claim 9, further comprising the steps of converting the karaoke performance signal into a radio signal receivable by the car radio and transmitting the radio signal to the car radio of the car.

12. A method of operating a karaoke system as set forth in claim 9, wherein the step of forming the image include projecting the image onto a projector screen disposed adjacent the parking space.

13. A method of operating a karaoke system comprising the steps of:

parking a plurality of cars, each of the cars having a car radio in a corresponding plurality of parking areas;

associating the plurality of parking areas with a karaoke apparatus;

sending a song request signal for a karaoke song from within at least one of the plurality of cars to the karaoke apparatus;

sending a voice signal representative of voice of a user from within at least one of the plurality of cars to the karaoke apparatus;

generating a karaoke performance signal based on the song request signal and the voice signal and an image signal for an image associated with the karaoke song;

forming the image on an image forming screen provided adjacent each of the plurality of parking areas; and sending the karaoke performance signal to the car radio of each of the plurality of cars.

14. A method of operating a karaoke system as set forth in claim 13, further comprising the steps of sending the song request signal from a wireless command device to a first receiver device coupled to the karaoke apparatus and sending the voice signal from a wireless microphone to a second receiver device coupled to the karaoke apparatus.

15. A method of operating a karaoke system as set forth in claim 13, further comprising the steps of converting the karaoke performance signal into a radio signal receivable by the car radio of each of the plurality of cars and transmitting the radio signal to the car radio of each of the plurality of cars.

16. A method of operating a karaoke system as set forth in claim 13, wherein the step of forming the image includes projecting the image onto a projector screen disposed adjacent each of the plurality of parking areas.

17. An interactive performance system for a car having a car radio, the system comprising:

an interactive performance apparatus, the interactive performance apparatus including a storage device that stores interactive performance data for at least an interactive performance, the interactive performance data including at least image data and sound data;

a space for parking the car, the space being associated with the interactive performance apparatus;

a wireless controller device that sends a performance command signal to the interactive performance apparatus for controlling the interactive performance;

a performance signal generating device in the interactive performance apparatus that generates an image signal based on the image data in the interactive performance data and a sound signal based on the sound data in the interactive performance data in response to the performance command signal;

an image forming device disposed adjacent the parking space for forming the image representative of the image signal; and a transmitter device coupled to the interactive performance apparatus for transmitting the sound signal to the car radio.

18. An interactive performance system as set forth in claim 17, further comprising an actuator system installed in a floor of the parking area and coupled to the interactive performance apparatus, wherein the actuator system is actuated to move the floor synchronized with at least the image signal.

* * * * *